(12) United States Patent
Kuzbari et al.

(10) Patent No.: US 10,528,856 B2
(45) Date of Patent: Jan. 7, 2020

(54) TRACKING SYSTEM (71) Applicant: NOVUS COMMUNICATIONS LTD, Grand Cayman (KY)

(72) Inventors: Safwan Kuzbari, Dubai (AE); Jamaleddine Nassar, Dubai (AE)

(73) Assignee: NVS Technology Solutions LTD, Dubai (AE)

( * ) Notice: Subject to any disclaimer, the term of this patent is extended or adjusted under 35 U.S.C. 154(b) by 0 days.

(21) Appl. No.: 16/096,553

(22) PCT Filed: May 2, 2017

(86) PCT No.: PCT/GB2017/051228
§ 371 (c)(1),
(2) Date: Oct. 25, 2018

(87) PCT Pub. No.: WO2017/187208
PCT Pub. Date: Nov. 2, 2017

(65) Prior Publication Data
US 2019/0138870 A1 May 9, 2019

(30) Foreign Application Priority Data
Apr. 29, 2016 (GB) .................................. 1607576.4

(51) Int. Cl.
*G06K 19/06* (2006.01)
*G06K 19/07* (2006.01)
*G06K 19/077* (2006.01)

(52) U.S. Cl.
CPC ....... *G06K 19/0704* (2013.01); *G06K 19/071* (2013.01); *G06K 19/0707* (2013.01); *G06K 19/0709* (2013.01); *G06K 19/0711* (2013.01); *G06K 19/07716* (2013.01)

(58) Field of Classification Search
CPC .......... G06K 19/0704; G06K 19/0707; G06K 19/0709; G06K 19/071; G06K 19/0711; G06K 19/07716
See application file for complete search history.

(56) References Cited

U.S. PATENT DOCUMENTS

| 2006/0176153 | A1 | 8/2006 | Tang |
| 2006/0208925 | A1* | 9/2006 | Wassingbo ................ G01S 5/02 340/990 |
| 2007/0046369 | A1 | 3/2007 | Schober et al. |
| 2007/0229271 | A1 | 10/2007 | Shionoiri et al. |

(Continued)

FOREIGN PATENT DOCUMENTS

EP 2104060 A1 9/2009

OTHER PUBLICATIONS

International Search Report—PCT/GB2017/051228—dated Oct. 9, 2017.
GB Search Report—Application No. GB1607576.4—dated Nov. 4, 2016.

*Primary Examiner* — Thien M Le
(74) *Attorney, Agent, or Firm* — Banner & Witcoff, Ltd.

(57) ABSTRACT

A tracking system comprising a tag reader comprising an interrogating antenna. One or more tags comprising an electrical energy generator configured to convert environmental energy to electrical energy. A radio frequency, RF, communication circuit. A controller configured to use the electrical energy generated by the electrical energy generator to transmit a data signal to the tag reader using the RF communication circuit.

17 Claims, 8 Drawing Sheets (56) References Cited

U.S. PATENT DOCUMENTS

| | | |
|---|---|---|
| 2008/0018466 A1 | 1/2008 | Batra et al. |
| 2008/0079550 A1 | 4/2008 | Briggs et al. |
| 2008/0103787 A1* | 5/2008 | Cavanaugh ........ G06Q 30/0282 705/347 |
| 2008/0174436 A1* | 7/2008 | Landt ................ G06K 19/0704 340/572.7 |
| 2008/0191875 A1 | 8/2008 | Park |
| 2009/0219139 A1* | 9/2009 | Slesinski ................ F03G 7/08 340/10.1 |
| 2010/0079238 A1 | 4/2010 | Gravelle et al. |
| 2011/0181399 A1 | 7/2011 | Pollack et al. |
| 2012/0026016 A1 | 2/2012 | Mitchell et al. |
| 2013/0265140 A1 | 10/2013 | Gudan et al. |
| 2014/0252091 A1* | 9/2014 | Morse ..................... F25D 29/00 235/385 |
| 2016/0189174 A1* | 6/2016 | Heath ................ G06Q 30/0201 705/7.29 |
| 2018/0107969 A1* | 4/2018 | Trivelpiece .......... G06Q 10/087 |
| 2019/0138870 A1* | 5/2019 | Kuzbari ............... G06K 19/071 |

* cited by examiner

TRACKING SYSTEM

CROSS-REFERENCE TO RELATED APPLICATIONS

This application is a U.S. National Stage application under 35 U.S.C. § 371 of International Application PCT/GB2017/051228 (published as WO2017/187208), filed Nov. 2, 2017, which claims the benefit of priority to United Kingdom Application No GB 1607576.4, filed Apr. 29, 2016. Benefit of the filing date of this prior application is hereby claimed. The prior application is hereby incorporated by reference in its entirety.

FIELD OF THE INVENTION

The present invention relates to a system for tracking items using electronic tags and in particular, a system including tags and a tag reader (e.g. RFID tags).

BACKGROUND OF THE INVENTION

It is important to be able to locate and track items, especially as they travel between places. Objects may travel within a single facility or move over greater distances or even transit between countries over land, sea and air. Such items may include freight, post, documents and individual parts of vehicles such as ships, trains and aircraft, for example. Passive electronic tags (e.g. RFID tags) may be attached to individual items so that they may be uniquely identified and interrogated locally at distances of between several millimetres and perhaps up to ten metres. Typically, tags are passive and have no stored electrical energy and so derive their required electrical power from an interrogating signal generated by a tag reader. Therefore, items and goods may be tracked as they pass particular points on a journey or between locations, provided that they pass sufficiently close to a tag reader (i.e. within a short interrogation and reception range). This can work well for freight, which has to follow a particular route with well-defined stops or freight depots. However, for items that travel on less defined routes or that do not have a particular end destination (e.g. parts of aircraft that are in constant use within the aircraft) then passive tags have drawbacks.

Active tags that carry their own power supply can be used to track larger items, such as freight containers. Such tags may have a large battery, a long-range wireless interface (e.g. a GSM radio or satellite communicator) and a position locator such as GPS or GSM triangulation unit. However, once the battery is exhausted then the tag ceases to function and the item will no longer be locatable. Furthermore, such tracking devices are only suitable for larger items due to their size and bulk.

US 2010/0079238 describes an RF-based tag that includes non-volatile memory and a piezo electric sensor. The piezo electric sensor produces an electrical charge that momentarily supplies electrical power to the tag when subjected to a mechanical force. This electrical power is sufficient to record data in the non-volatile memory. Therefore, such a tag can record events that occur during a journey and the non-volatile memory can be read at the end of such a journey to provide additional information. However, such a tag cannot be used to locate items at longer distances.

It is often important to be able to locate individual parts of a vehicle, such as an aircraft. For example, should an aircraft be leased then certain parts may be swapped or replaced during the leasing period. When the aircraft is returned to its owner, then all of the parts must be accounted for. This can be important for regulatory and safety purposes or to audit the number of hours that particular parts have been used so that they can be replaced or serviced appropriately. Furthermore, it can be found that parts are swapped between individual aircraft within a fleet. When those aircraft are returned to their owner or passed on to a new carrier, then again, the original parts must be returned to the original aircraft. In order to track such movements and changes, then significant effort and paperwork may be required to locate missing or moved parts.

Similarly, valuable items such as jewellery and important documents may be transported and moved in use. It is usually not feasible to provide such small items with active global tracking systems due to the added bulk. However, small but valuable items can be lost or misplaced more easily and so it is useful to know their whereabouts at any given time, which is not currently feasible.

Therefore, there is required a method and system that overcomes these problems.

SUMMARY OF THE INVENTION

A tracking system includes an interrogator or reader that is typically in close proximity (e.g. up to a radius of 12 m or up to a radius of 100 m) from one or more tags or network of tags. Each tag can receive a signal from the reader and send a signal in response or may send data at intervals (regular or otherwise) in the absence of any interrogating signal. The signal from the reader may be used to provide power to the tag and/or may be absent of any data (or may not in itself cause any response, for example). For example, the signal or response may be the tag's unique identifier or may include other data that is received and processed by the reader. The tag is powered by a mechanical energy harvester, which generates at least sufficient energy to send the data to the reader (and to receive any interrogating signal where used or in range). This energy may be optionally stored, for instance, using a battery, storage unit, capacitor, super capacitor or solid state device. A plurality of tags may operate in this way. Advantageously, the tags may have a timer or operate intermittently (e.g. on for one minute and then sleep for one hour or longer or other periods) to converse energy or to allow enough energy to be harvested for a brief operation. The tags may form an energy harvesting wireless sensor network (EHWSN). The tag may be read without requiring a direct line of sight.

The reader may store the information for later retrieval or may be in communication with a central server using a network such as a cellular network, a satellite network or other long-range wireless network. The reader and one or more tags may be placed within a vehicle such as an aircraft or ship and the tags may be attached to or within items within the vehicle (e.g. goods in transit) or parts of the vehicle itself. Therefore, the overall system allows many different items may be tracked more reliably over long distances without requiring large batteries in each tag to power a long range transceiver (i.e. for communicating directly with the central server).

In accordance with a first aspect there is provided a tracking system comprising:
  a tag reader comprising an interrogating antenna;
  one or more tags (e.g. one or more electronic tags or radio frequency identification (RFID) tags) comprising:
    an electrical energy generator configured to convert environmental energy to electrical energy;
    a radio frequency, RF, communication circuit; and a controller configured to:
  use the electrical energy generated by the electrical energy generator to transmit a data signal to the tag reader (e.g. RFID tag reader) using the RF communication circuit.

The electrical energy generator (e.g. a mechanical electrical generator) allows tags to gain enough electrical energy to respond to interrogating signals by a reader (or simply to send the data) at greater distances and more reliably without requiring bulky batteries (or a very large interrogating signal), as electrical energy can be generated in transit or as the tag is moved. The tag reader may comprise a receiver (or transceiver) for receiving the data signal from the tag and an interface for communicating at longer distances (e.g. greater than 100 m or 1 km) to provide a different entity with the gathered tag data. The RF communication circuit may use a wireless fidelity protocol. The tag may further comprise an RF to electrical energy harvesting module for empowering purposes. The mechanical energy may be derived from acoustic energy, for example. Mechanical energy may include any movement type, including vibration, motion, and acoustic energy (at any or specific frequency or frequency range). The tag may also include an RF to DC circuit that may provide additional or alternative power (e.g. for load, sensors, control circuit, communication circuit, and/or WiFi transmitter, for example). The tag may also use the RF to electrical energy converter to transmit the data signal to the tag reader using the RF communication circuit.

Advantageously, the tag reader may further comprise a wireless network interface, the tracking system further comprising:
  a receiving server configured to receive data from the wireless network interface of the tag reader, the received data including information associated with the data signal (or response to an interrogating signal) from the tag. Therefore, the system can more effectively report the locations or other information about items (e.g. in transit). The reader may be powered by a vehicle's power supply (for example) but the tags only need a small amount of energy (provided by mechanical movement) to send the data (and/or respond to interrogation requests), which may then result in this information being sent back to a central location (or cloud-based server). In this way, a large number of items can be tracked over large distances and long time frames (e.g. months or years). Preferably, the tag or tags travel or move together with the tag reader (e.g. within the same enclosure, vehicle, box, device, and/or they are local to each other) and the receiving server is remote from the combination of tag reader and tag(s). In other words, the tags communicate with the reader using one transmission protocol (e.g. a short range or lower power protocol) and the reader communicates with the central server using another different transmission protocol (e.g. long range or higher power protocol).

Preferably, the tracking system may further comprise a database configured to store the received data. The database may be centrally located (e.g. a physical server), cloud based or split between locations (e.g. local to the reader and server).

Preferably, the receiving server may be configured to send a request to the tag reader and the data is received in response to the request. Alternatively, the receiving server may receive ad hoc or regular signals from the tag reader or readers.

Optionally, the wireless network interface may be a cellular interface, a satellite interface, a Wi-Fi interface or an 802.11 interface. Other wireless network interfaces may be used.

Advantageously, the tag may further comprise an energy storage device configured to store electrical energy provided by the electrical energy generator (e.g. mechanical to electrical energy converter) and to supply the stored electrical energy for use by the controller and RF communication circuit (e.g. transmitter or transceiver). Therefore, excess energy can be stored for use when an interrogating signal is received but when there is no mechanical movement to generate power for the transmitter and/or controller. The tag may be an electronic tag, RFID tag or other type of tag, for example.

Preferably, the data signal (and/or response) may include a unique identifier of the tag. However, other information may also be included.

Advantageously, the RF communication circuit of the tag may be a transceiver and the tag reader may be configured to send an interrogating signal to the tag reader and further wherein the tag may be configured to transmit the data signal to the tag reader in response to the interrogating signal.

Optionally, the tag may be further configured to generate from the interrogating signal electrical energy to power the RF communication circuit and the controller. This electrical energy may be in addition to the generated power (e.g. mechanical, thermal, and/or solar energy).

Optionally, the electrical energy generator may be any one or more generation element including:
  a mechanical to electrical energy convertor;
  a thermoelectric generator;
  a solar electricity generator;
  a piezo generator; and
  an RF power generator.

According to a second aspect, there is provided a tag comprising:
  an electrical energy generator configured to convert environmental energy to electrical energy; and
  a controller configured to use the electrical energy generated by the electrical generator (e.g. mechanical to electrical energy converter) to transmit a data signal to the tag reader using the RF communication circuit. The communication circuit may use any frequency or band and especially those licensed for use in the particular country or countries that the tag is to be used in. In a particular example, the tag may include a mechanical to electrical energy converter together with a thermal generator.

Optionally, the tag may further comprise an energy storage device configured to store electrical energy provided by the electrical energy generator and to supply the stored electrical energy for use by the controller and RF communication circuit.

Optionally, the energy storage device may be a capacitor or a secondary battery. Other energy storage devices may be used.

Advantageously, the tag may further comprise one or more sensors and wherein the controller is further configured to include data generated by the one or more sensors in the data signal.

Preferably, the tag may further comprise a memory store configured to store the data generated by the one or more sensors. The memory may be a non-volatile memory (e.g. FLASH memory) and may store the data until next in communication with the RFID reader and/or at a particular time or location.

Optionally, the one or more sensors may measure any one or more of: humidity, vibration, movement, motion, acceleration (an accelerometer), gyroscope, GPS, temperature, light or sound. Other sensors or peripherals may be included. Any one or more of the sensors may be formed from MEMS.

Optionally, the controller may comprise an electrical circuit, a microprocessor, and/or computer software or firmware. Any or all of the components of the tag may be incorporated within the same circuit, board or package or be separate.

Optionally, the communication circuit may be a transceiver (i.e. transmit and receive rather than only transmit) and the controller may be further configured to receive an interrogating signal from the tag reader and to transmit the data signal to the RFID tag reader in response to the interrogating signal.

Preferably, the tag may further comprise an antenna electrically connected to the RF communication circuit. The antenna may be integrated (with the controller or other circuit), internal to a package or external. The antenna may be a loop, dipole, uni-directional or multi-directional. There may be multiple antennas (e.g. two, three, four or more) that may each be optimised for a particular orientation so that the tag can receive and/or transmit data and/or be used and receive RF power in any orientation.

Optionally, the tag may further comprise an electrical circuit configured to convert a signal received by the antenna into electrical energy to power the RF communication circuit and the controller. This may be the same or a separate antenna to that receiving and transmitting a response to the interrogating signal.

Optionally, the controller may be further configured to power the RF communication circuit intermittently. This may save power and/or bandwidth and may also avoid interference from multiple tags operating simultaneously.

Optionally, the electrical generator may be a piezo generator. Other types of generator may be used including spring, magnetic generators and/or thermal gradient energy generators.

Optionally, the electrical energy generator may be any one or more generation element including:
   a mechanical to electrical energy convertor;
   a thermoelectric generator;
   a solar electricity generator;
   a piezo generator; and
   an RF power generator.

Optionally, the tag may further comprise a control circuit configured to manage the electrical energy generated by any one or more of the generation element or elements. This can use multiple generation elements at once (if insufficient power is available) or switch off or to fewer generation elements is too much power is being generated, for example. The control circuit may also control electrical storage (again storing or depleting as necessary).

Preferably, the tag may further comprise an enclosure. This may be a case or potting compound, for example. Plastics, resin, metal, composite or other materials may be used.

The enclosure may weatherproof, dust proof, solvent resistant, and/or heat or cold resistant. This allows the tag to operate in different types of hostile environments.

Optionally, the tag may be formed from a PCB board. The tag may be flexible or formed from a resilient material such as a plastics or rubber material. An enclosure may be provided to the tag. The printed circuit board (PCB) for the tag may be formed to be flexible and/or elastic. The PCB may be formed from multiple mini boards. The PCB may have a flat cable or be a flexible PCB board. The PCB or tag may also be formed to take the shape of the tagged object.

In accordance with a further aspect, there is provided a tag that uses at least two different sources on energy. These sources of energy (used to generate electrical power) may be selected from any two or more of: solar, mechanical (including acoustic, vibration, thermal, translation in any one or more dimensions), electromagnetic, radio frequency, battery or capacitor. Such a tag may selectively switch between sources of energy (e.g. automatically, as sources become available and/or to protect against over and under power events). The sources of energy may be merged, stored or used as they are generated. The at least two sources of energy are used to power a controller and RF transmitter or transceiver. The tag may be used to respond to an interrogating signal and/or provide a data signal at intervals in the same or similar way to that described with regards to other tags in this description. The tag may be used with any or all tag readers described in this description.

Preferably, the tag may further comprise an RF to DC conversion circuit. This may convert an RF signal (e.g. received by one or more antennas) and generate electrical power from it for storage or immediate use.

In accordance with a further aspect there is provided a tracking system comprising:
   a tag reader comprising an interrogating antenna;
   one or more tags (e.g. one or more electronic tags or radio frequency identification (RFID) tags) comprising:
      a radio frequency (RF) to electrical energy converter configured to generate electrical energy;
      a radio frequency, RF, communication circuit; and
      a controller configured to:
         use the electrical energy generated by the RF energy converter to transmit a data signal to the tag reader (e.g. RFID tag reader) using the RF communication circuit. Additional electrical energy may be provided by using a mechanical to electrical energy converted and/or a solar energy converter (e.g. photovoltaic). The tracking system may further comprise a receiving server configured to receive data from the wireless network interface of the tag reader, the received data including information associated with the data signal (or response to an interrogating signal) from the tag. The server may have any or all of the features of other receiving servers described throughout this description.

According to a further aspect, there is provided a tag comprising:
   a radio frequency (RE) to electrical energy converter configured to generate electrical energy; a radio frequency, RF, communication circuit; and
   a controller configured to use the electrical energy generated by the electrical generator to transmit a data signal to the tag reader using the RF communication circuit. Additional electrical energy may be provided by using a mechanical to electrical energy converted and/or a solar energy converter (e.g. photovoltaic). In addition, the tag may compromise a low power sensor to harvest energy from a temperature gradient, this energy may be accumulated to store events detected or monitored by the tag (e.g. interrogations, changes to data, etc.)

Optionally, the tag may be further configured to record data acquired from the electrical generator. In other words, the electrical generator (or different types of electricity generators that form the electrical generator) may both generate power for use by the tag and also act as a sensor or sensors to record data.

Preferably, the tag may further comprise a memory store (e.g. a persistent or passive memory like FLASH) configured to store the data acquired from the electrical generator. Therefore, data may be acquired over extended periods.

According to a further aspect there is provided a method for operating a tag having an electrical energy generator configured to convert environmental energy to electrical energy and a radio frequency, RF, communication circuit, the method comprising the step of:

using electrical energy generated by the electrical energy generator to transmit a data signal to a tag reader using the RF communication circuit.

Preferably, the data signal includes an identifier of the tag. Therefore, tags (and any items attached to the tags) may be uniquely identified.

Advantageously, the method may further comprise the steps of:

acquiring data from the electrical energy generator of the tag; and storing the data before transmitting the data signal, including the acquired data, to the tag reader. The electrical energy generator may act as both power provider and sensor, which can save weight, reduce complexity, reduce power requirements and cost as separate components are not required.

Optionally, the acquired data may indicate any one or more of:

a time period that electrical energy was being generated by the electrical energy generator;

a power level generated by the electrical energy generator;

a number of times the electrical energy generator was generating power; and a number of times the electrical energy generator reached one or more threshold power levels. The data acquired by the electrical generator (which may simply be the amount, time, and/or level that power was being generated) can indicate properties about the tag's environment. The electrical generator may include several components that each generate power based on different environment properties. The relative levels of power generated by two or more of these components may also provide data that can be interpreted to describe properties or activities. For example, a temperature gradient experienced by a thermoelectric generator may indicate the temperature of an item and vibration levels used to generate power from a mechanical to electrical generator may indicate how much an item is being used (e.g. engine and engine power). The data itself may only be recorded (i.e. to save limited memory space) when certain criteria or power levels (or combinations of power levels are detected).

Preferably, the method may further comprise the step of:

determining any one or more of: a cycle number, operation number, operation time; a service interval, number of aircraft flights, and abnormal operation characteristic, of a component attached to the tag based on the acquired data. Other information may be determined.

Preferably, the determining step may further include analysing a plurality of data items within the acquired data to determine a repeated series of events defined by the plurality of data items. This may be used to indicate cycles (e.g. engine power cycles, such as take off and landings for an aircraft)

Optionally, the tag may be attached to any of: an aircraft, vehicle, an engine, a power unit, an auxiliary power unit, thrust reverser; and landing gear. These may be parts of an aircraft or other vehicles. Tags may be attached to other items to record their environment over time. The tags may include one or more timers or clocks so that the time of data collection can be recorded.

The protocols and operating procedures described above may be implemented as a computer program comprising program instructions to operate a computer. The computer program shall be stored on a computer-readable medium.

The computer system shall include a processor such as a central processing unit (CPU). The processor shall execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

A tracking system uses environmental energy to monitor and analyse the status of items over long distances. Various sources of environmental energy may be used to generate electricity used and stored by the system. The system uses a wireless sensor network that may form a communication system grid.

The system may include several parts including:

1. A node, access point node (APN) or tag reader, which collects data and the information from distributed tags.

2. "Tag" or "intelligent sensor board" (EPT or end point tag) that can monitor the status of the parts in order to report to multiple nodes.

3. A software interface design to link and monitor the collected data from the distributed sensors.

This node design establishes a preferably secure connection with tags to ensure and protect data delivery and to reduce redundancy. Data are encapsulated using a specific and common frame format.

The tag uses a stable and reliable wireless sensor board with an external box or enclosure design that can be used in harsh environments. The tag is self-powered from energy harvested from the operational site and may communicate using a wireless (e.g. Wi-Fi) data connection.

Tags form an energy harvesting wireless sensor network (EHWSN). The tags send data through a defined wireless protocol and receive energy from at least one or two sources: an emitted RF generated signal, and a vibration module. The tag regulates these two sources in order to deliver a stable power source for a microcontroller, wireless transceiver and other sensors (without any externally charged battery supply). The tags may be initiated and partially (or wholly) powered by the access point node(s) (APN(s)), which shall also gather, process and transmit collated data for onward transmission or storage.

Figure 1:
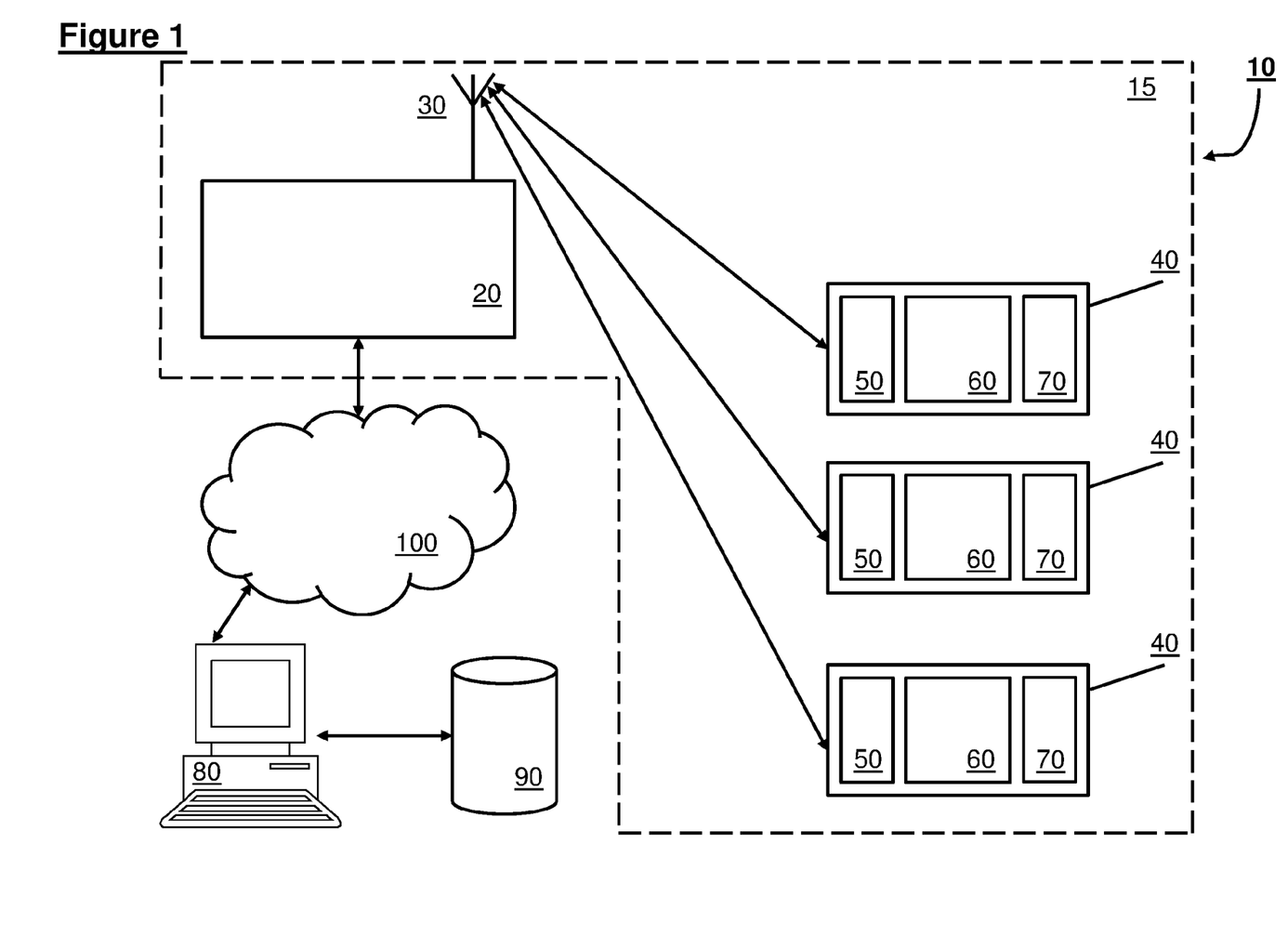
FIG. 1 shows a schematic diagram of a system for tracking items, wherein the system includes tags.

FIG. 1 shows a schematic diagram of a tracking system 10. Several items are enclosed in a dashed box 15 and these may be in close proximity to each other (several millimetres up to several tens of metres from each other). For example, all of the items within the dashed box 15 may be within a particular item (e.g. vehicle, aircraft, ship, train, automobile, truck, power plant module, solar module plants, etc.). A tag reader or interrogator 20 has an antenna 30 for wirelessly communicating with individual tags 40. In this figure, three tags 40 are shown but a number from one upwards may be used. Each tag may contain a mechanical to electrical energy convertor 50, an RF communication circuit or circuits (e.g. transmitter, transceiver or separate receiver and transmitter) 60 and a controller 70. The RF communication circuit 60 may provide at least two functions. These may be to communicate with the tag 40 (e.g. using WiFi) and also to provide RF power to the tag 40. At a remote site, there may be a server 80 that has an associated database 90. The server 80 is in communication with the tag reader 20 over a wide area network 100 that may be the internet, a cellular network, a satellite system, or other wireless (or in part wired) communications network. The server 80 (which may be physical or cloud-based) may monitor a plurality of different tag readers 20 although only one is shown in this figure for simplicity. More than one tag reader 20 may be used in each locality or vehicle, for example.

Therefore, the tags 40 only need to communicate over relatively short distances but individual items that may be attached to each tag 40 can effectively be tracked at any distance and monitored centrally by the server 80. For example, the server 80 may send a signal over the network 100 to one or more tag readers 20, which sends a signal through its antenna 30 to be received by each tag 40 and in response; each tag sends a signal back to the tag reader 20. These data may be communicated over the network 100 back to the server 80 and optionally recorded in the database 90. Therefore, tags and consequently items attached to those tags that do not respond, may be determined to be missing. Furthermore, a tag 40 that should be located within a particular system 15 (e.g. an original part of an aircraft) may be found elsewhere by a different tag reader 20 in another system 15 when it receives a data signal from this particular misplaced tag 40. The different tag reader 20 may then report the new location through the tag reader 20 to the server 80, which may update the database 90 in response. In one example, a tag 40 may be attached to an aircraft part (e.g. an engine). Should the engine be removed and moved to a new aircraft, then the tag reader 20 on the new aircraft may report the presence of such a part, which may automatically be logged and audited without need for additional paperwork.

The system 10 may operate without the tag reader 20 sending out any interrogating signal. Instead, each tag 40 may transmit (without prompt) a regular data signal, which is received by the tag reader 20. The server 80 may request from any one or more tag readers 20 the last set of received data. The system 10 may also operate in either or both modes (regular data transmissions and/or interrogating signals and responses).

Figure 2:
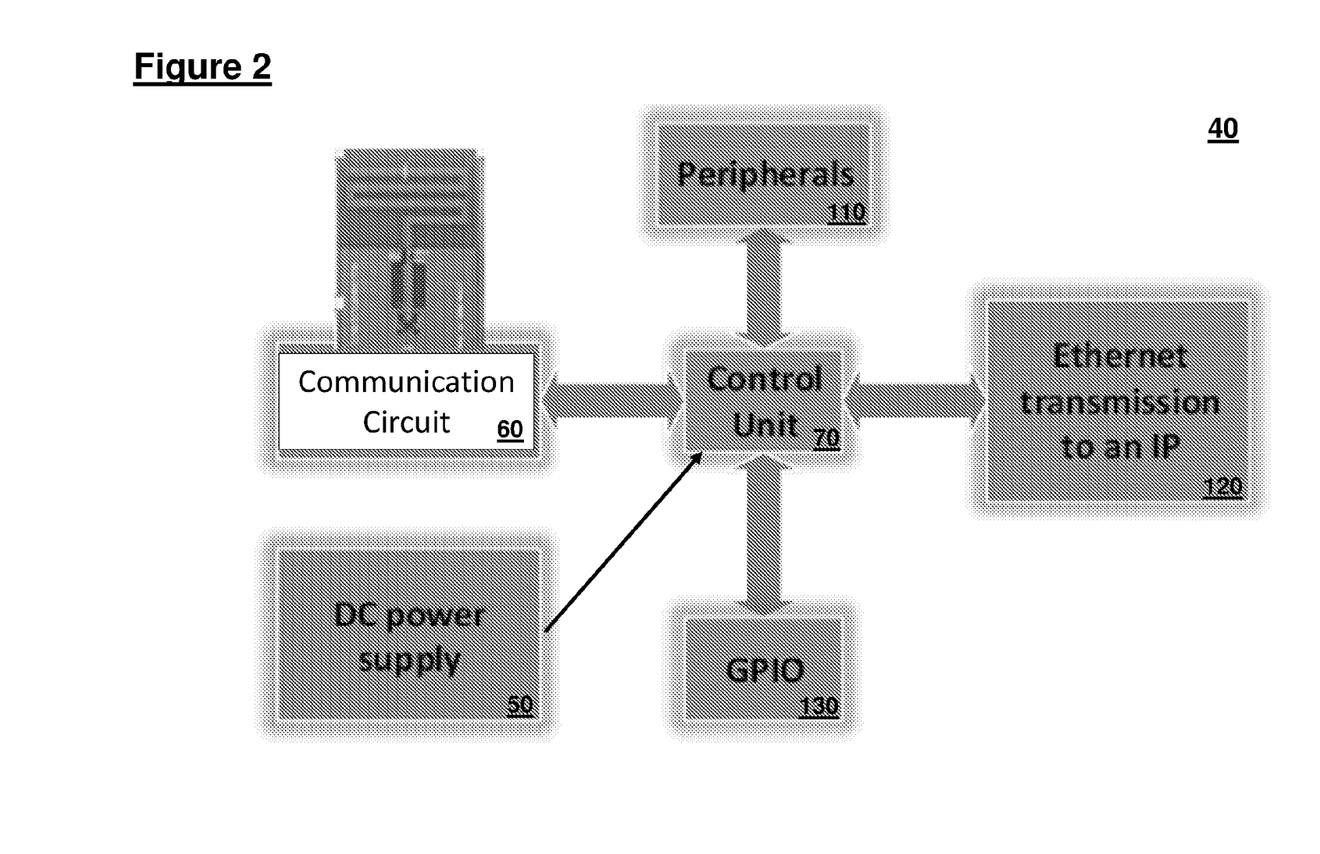
FIG. 2 shows a schematic diagram of a tag within the system of FIG. 1.

FIG. 2 shows a schematic diagram of an individual tag 40 in further detail. The control unit 70 is shown connected to the RF transceiver (or transmitter) 60, mechanical to electrical converter 50 and a thermal energy harvesting device from a specified generator, which provides DC or AC power (e.g. using a DC/DC or AC/DC converter) to the control unit 70. Additional peripherals or sensors 110 may be attached to the control unit 70. An Ethernet transmission unit 120 may provide internet protocol communications using the RF transceiver (or transmitter) 60. A general purpose input/output unit 130 may also be connected to the control unit 70 for other communications (e.g. tests, setup, firmware updates, etc.).

The mechanical to electrical converter 50 may be a piezo vibration sensor/generator element that may momentarily provide electrical power when the tag 40 moves or vibrates, which may be due to the motion or vibration within a vehicle. Such energy harvesting provides a tag 40 with sufficient power such that it does not need to rely on a nearby interrogating signal for power and its range may be extended. This may be important in large vehicles, such as aircraft, ships and trains (which are capable for housing the separate tag reader 20), for example. However, each tag 40 may additionally include an electrical circuit to take energy from the interrogating signal if this is strong enough (i.e. if the tag reader 20 is close to the tag 40). Therefore, the tags 40 may have more than one source of power.

Figure 3:
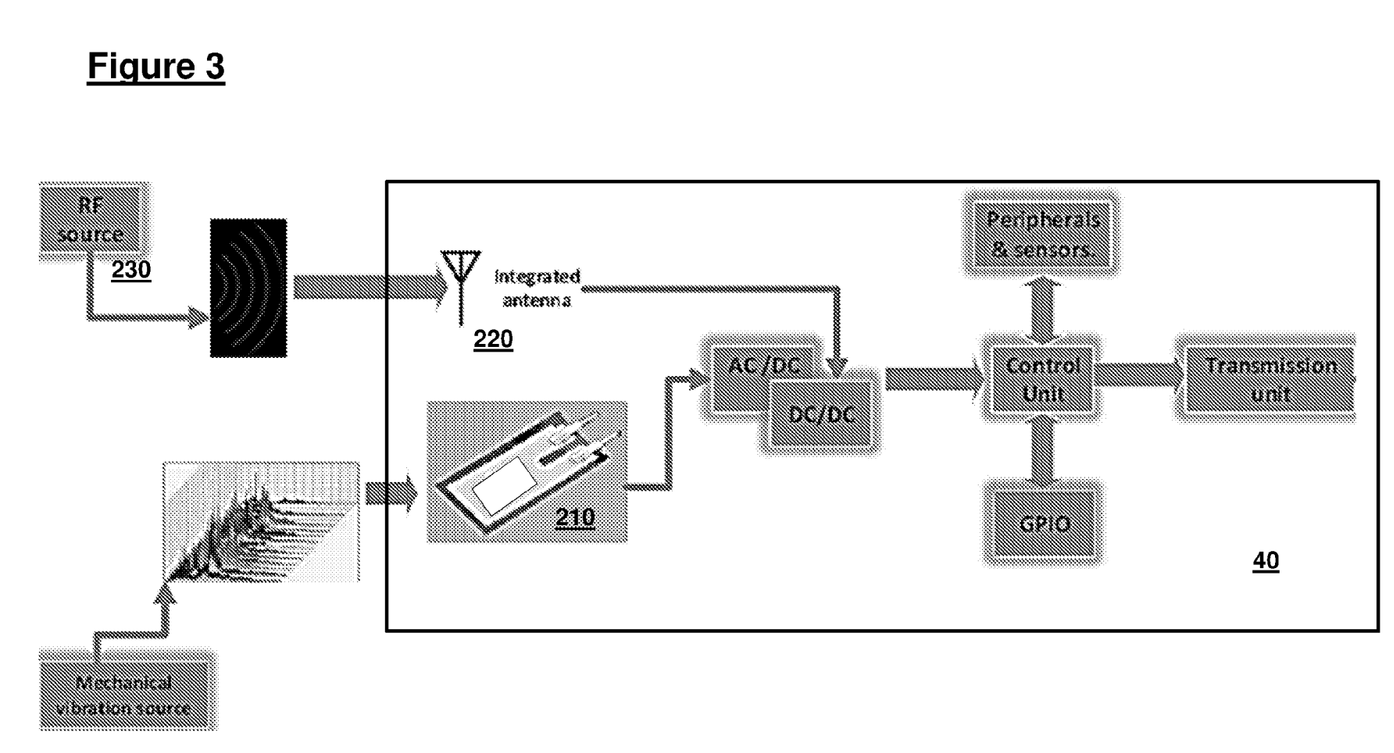
FIG. 3 shows a further schematic diagram of the tag of FIG. 2 including different sources of electrical energy for the tag.

FIG. 3 shows a tag 40 and further illustrates schematically two ways in which energy may be generated and used to power the control unit 70 and electrical components within the tag 40. In particular, the piezo vibration sensor 210 is shown connected to an AC to DC convertor. An RF source 230 (e.g. from the tag reader 20) produces RF energy received by an integrated antenna 220, which is connected to a DC to DC convertor in order to condition the signal for use as power within the tag 40. Additionally, energy storage may be included within the tag for storing harvested energy either from a mechanical to electrical converter and/or from the RF source 230.

Figure 4:
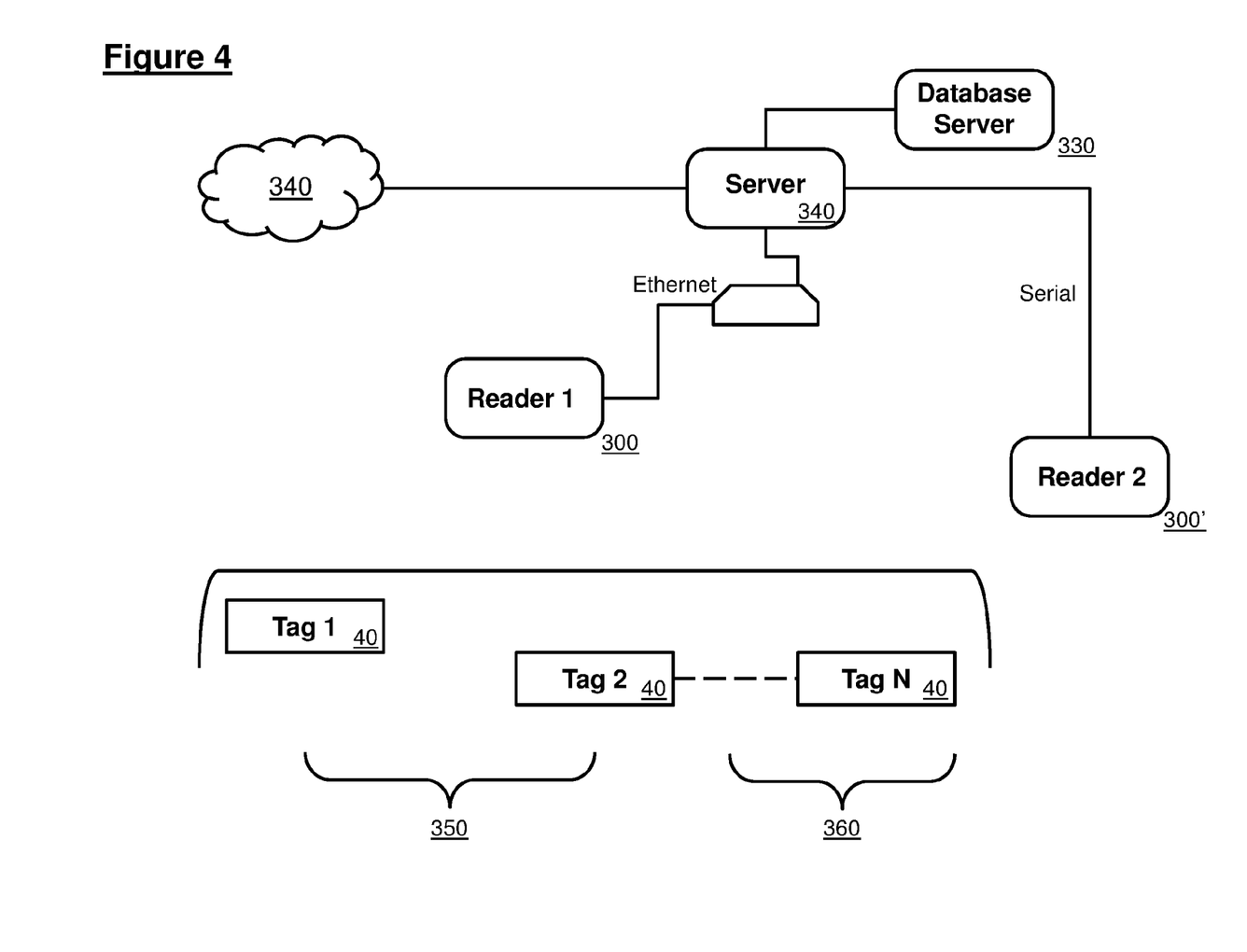
FIG. 4 shows a schematic diagram of a system for monitoring the tags of FIGS. 2 and 3.

FIG. 4 shows a further schematic diagram including more details of the tag reader, tags 40 and particular processing of signals to and from the tags by the tag reader 20. There may be more than one interrogator 300 within a local environment. Each interrogator may each have an antenna 30 and associated RF interface. In this example implementation, a first interrogator or reader 300 is in communication with a local server 320 through an Ethernet connection using Ethernet switch 310. A second interrogator or reader 300' is in serial communication with the server 320. There may be more than one Ethernet and/or serially connected interrogators 300, 300' within the local environment 15. The server is in communication with a local database 330, which may be a MySQL server, for example. Tags 40 may be grouped into different sets 350, 360 and read by either or both interrogators 300, 300'. In this way, some processing may be carried out by the server 320 locally before reporting results to a data processing service 340, which may be a dedicated physical server 80 or a cloud-based web service or virtualised server. There may be one or more tag readers within this local system.

As described previously, each tag 40 may be powered using one or more sources of energy:

Where RF energy is used then it may be harvested and switchable between the following example frequency bands:
  a. GSM-850 uplink.
  b. Europe RFID & GSM-850 downlink.
  c. ISM USA & GSM-900 uplink.
  d. GSM-1800 uplink.
  e. GSM-1900 uplink.
  f. Wi-Fi 2.4 GHz.

Any one or more of these bands or protocols may also be used to send data back to the central server 80. More generally, two frequency bands may be used, e.g.: 820 MHz to 960 MHz and 2.40 GHz to 2.45 GHz.

The mechanical energy may be harvested from any one or more of:
  a. Low frequency environment:
    i. X, Y and Z acceleration.
    ii. In general, the vibration environment may have an acceleration between ±0.05 g in the operating mode but in the sleep and/or a deep sleep mode it may be between ±0.5 g applied for between 0 and 900 seconds.
  b. The operating mode may be active for 45 minutes, for example. The sleep mode may vary between 240 and 720 minutes, for example.

3. On the tag 40, multiple circuits may be implemented to deliver a stable and reliable voltage to a low power control unit (controller 70), sensors 110 and transmitter or transceiver 60.

4. An Omni-directional antenna (preferably with a near to isotropic energy pattern) may be provided to each tag 40.

5. A capacitor or battery may be used to store the generated energy (from either or both sources) and provide regulated power to the tag 40.

6. Preferably, SMD (surface mounted device) using multiple layers may be used to reduce tag size and footprint.

7. Mechanical strengthening may be used to enable the tag 40 to withstand harsh environments in some embodiments. Lighter and smaller or less rugged designs may be used for more benign environments.

8. The tag 40 may include any or all of the following sensors: humidity, temperature, light, an external GPIO (general purpose input output) component.

9. The tag 40 may include a thermal gradient generator to supply the tag with power and data.

The access point design (RFID tag reader 20) may collect all frames of data from the EHWSN (network) or individual tags 40. For example, the RFID tag reader 20 may manage up to 8000 simultaneous connections with high reliability and avoiding frame redundancy and collision. The RFID tag reader 20 may include a GSM module to provide wide area network connectivity. Software on the RFID tag reader 20 and/or tag 40 may be written using C, C++ or another suitable language.

The collected data (e.g. from one or more tags 40) may be encapsulated in a suitable format (e.g. CSV or Jason format). Other formats may be used, such as database formats or mark-up formats. The data may be sent to the server 80. The RFID tag reader 20 may include a transceiver that will respect the same wireless protocol used within the tags 40. The RFID tag reader 20 may be powered with a DC voltage between 8 and 28 volts in this example, although other power supply parameters may be used. The RFID tag reader 20 may include software or firmware able to locate or communicate with individual tags 40 over defined range (e.g. up to 5 m, 10 m, 20 m, 100 m or further).

The energy source of the tag 40 may use a mechanical to electrical energy converter, such as a piezo transducer. However, this may be supplemented by power derived from the RF transmitter of the RFID tag reader 20, preferably received using an integrated omnidirectional antenna on the tag 40.

Tags 40 may operate using firmware using a C platform to control and monitor inputs and to execute an algorithm for tag wireless localization. The controller 70 may also control and monitor request received from the RFID tag reader 20 and receive data frames in a suitable format over a serial and/or Ethernet communication. The RFID tag reader 20 may also include platform including a physical local server to manage data received from tags 40. This local server may include a database to store and provide data on request.

Particular functions of the software or firmware platform within the tag reader 20 to control and monitor tags may include any one or more of:
  DataCollectorManager;
  QueueTemporaryStorage;
  DataTransmissionManager;
  LocalizationManager;
  TimeSyncManager; and
  ServerComTask.

The software or firmware within each tag 40 may include any one or more of:
  DataCollectorManager;
  SensorManager;
  PowerManagementManager; and
  TransmissionManager.

Application interface(s) may be included to manage and process data between different elements or components in the system. These application interfaces may provide a more stable and reliable tracking application for real-time processing, with a large data database design, which is preferably extensible.

Power selection priority may be used. This may help meet particular regulations. The system may also be used with documents (e.g. tracking, sorting and filing). Each tag and/or reader may have an expected life of up to 15 or 20 years. Each tag may be flexible and/or configured to conform to the shape of items that it may be attached to.

In one example, the operating power range between the tag (end point tag or EPT) and the reader (APN) may require a range or 10-12 m and may take into account various type of obstacle including: plastics, metal and glass. The size of the EPT may comply with the ISO/IEC 7810 which is ID-1: 85.60×53.98 mm. the tag enclosure may be as thin as possible and may include an integrated solar thin film.

The tag may be powered from multiple sources of energy (e.g. any one, two or three of the following):
  i. RF energy may be harvested and switchable between as available from the following list of example frequencies bands (or more generally, two frequency bands may be used, e.g.: 820 MHz to 960 MHz and 2.40 GHz to 2.45 GHz.):
    a. GSM-850 uplink.
    b. Europe RFID & GSM-850 downlink.
    c. ISM USA & GSM-900 uplink.
    d. GSM-1800 uplink.
    e. GSM-1900 uplink.
    f. Wi-Fi 2.4 GHz.
  ii. A harvester on the tag may be connected to an integrated Omni directional antenna on the tag's PCB and it may optionally harvest 1.2 Volts to power a booster or voltage converter to deliver 3.3 volts to charge a SMD super capacitor (Vcap) and then to supply control, sensor and transmission units.
  a. An example harvester may be a chipset that provides any one or more of:
    i. High conversion efficiency up to 75%.
    ii. Wide RF operating range −17 dbm to +20 dbm.
    iii. Wide frequency range: 100 MHz to 6 GHz.
    iv. Packaging SC-70.
  b. The booster may be a chipset that provides any one or more of:
    i. High efficiency up to 95%.
    ii. Packaging: SOT23-6.
    iii. Capable of 5.5V @50 mA output.
  c. The RF to DC circuit may transform and harvest the above-mentioned frequencies or frequency bands.
iii. Solar energy harvesting preferably integrated on the outside package of the EPT.
iv. The implemented regulator on the EPT's PCB shall support multiple source of energy. This design defines the presence of the RF energy to operate otherwise the regulator restricts or shuts off power as per the scheme described with reference to FIG. 5.
A DC regulator for the Solar and Vibration Piezo (with a double AC input) may use a QFN 6×6×0.85 mm dimension package. This may provide an output current up to 100 mA over 3.3 Volts. Alternatively, another zero power wireless sensor may be used (in this case, a different microcontroller may be required).

Figure 5:
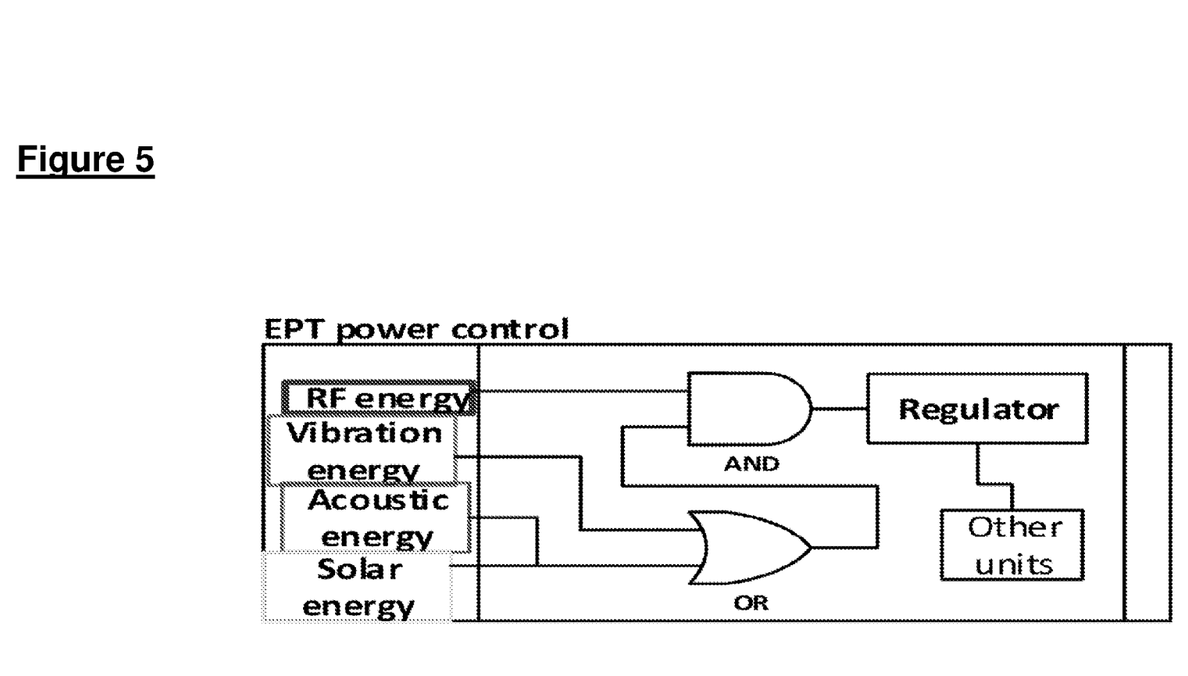
FIG. 5 shows a schematic diagram of power sources for an example tag, as well as selection and priority logic for each source of power.

FIG. 5 illustrates schematically the different power sources for a tag 40. Mechanical harvested energy:
  a. Low frequency environment (vibration energy): In general, the vibration environment will have an acceleration between ±0.05 g in the operating mode but in the sleep and deep sleep mode it will be between ±0.5 g the time to consider is between 0 to 1350 seconds.
  b. Operation time of may be limited to 45 min as maximum, the sleep mode can vary between 240 and 720 minutes.
  c. Acoustic energy harvesting (this may depend on environment, including airplane energy distribution).
  d. Thermal gradient generated electrical energy.
2. Multiple circuits within the EPT may be implemented to deliver a stable and suitable voltage to a low power control unit, sensors and transceiver.
3. An Omni antenna design on EPT's PCB reliably receives RF energy from all the directions in order to be operational all the time and at all the locations.
  a. The antenna may receive transmitted energy with multiple polarization: vertical, horizontal and circular:
    i. For RF energy, an orthogonal antenna with λ/4 wavelength of the received signal with antenna feed and an example impedance 75 Ω.
    ii. Matching Network circuit (between the transmitter and the receiver) avoids or reduces electromagnetic interference (EMI).
    iii. Antenna or multiple antenna band width may cover from 860 MHz till 960 MHz with the 2.39 GHz till the 2.45 GHz (with a minimum of reflection up to 1% as an optional maximum).
    iv. Return loss antenna may not exceed 5% to have an improved pattern radiation.
    v. The receiver may operate at least 3.3 volts with 32 mA load.
  b. A smart antenna with multi path reception (isotropic pattern reception) is provided on a multilayer path PCB design. Alternatively, a chip smart Antenna may be used to reduce required space on the PCB.
  c. Antenna design may comply with HID regulations.
4. Use of a specific supercapacitor (e.g. Thin line 2.0 mm 5V 85 mF 85 mΩ).
5. SMD (surface mounted device) with multiple layer provide a small tag size (e.g. maximum size being a credit card size) and foot print. Flexible shapes may be used with multiple mini boards interconnected by robust flat cables. The EPT's PCB layout may divide into multiple modules that may be separated.
6. A cover may be provided to the PCB tag for normal environments and/or for harsh environments as required.
7. The EPT may include the following sensors: temperature, light, external GPIO (general purpose input output), humidity, etc.
8. Security and encryption within communications between the EPT(s) and the APN(s).
9. A simulation for the functionality for mixed signal processing testing on board may be carried out.
10. EPT's and APT's firmware may use C code or other suitable programming language. This code is able to at least carry out any one or more of:
  a. Read multiple sensors by interrupt programming: light, temperature, humidity.
  b. An GPIO input is ready to read data and Voltage level up to 3.3 Volts to the control unit.
  c. Coding and firmware may comply with: aviation standards as, RTCA DO-178C, DO-178B, ARP4754 and DO-254.
11. The microcontroller may be a 16 bit (QFN package) with nanoWatt technolgy having any one or more of the following consumption proprieties:
  a. 20 nA Deep Sleep mode.
  b. 25 nA Sleep mode.
  c. 500 nA on real-time clock but in the sleep mode status.
  d. 195 uA at 1 MHz run operating mode.
  e. 5 uS wake-up from sleep mode.
  f. −40 C to 125 C.
12. The wireless communication may be based on P2P wireless protocol with an integrated antenna (Tx operation 32 mA and Rx operation 21 mA).
13. The mechanical design of the enclosure may contain a thin solar energy film (e.g. PV) shall be of a suitable size to safely house the Tx, Rx, controller and collect sources with the minimum weight necessary.
APN:
An example access point node (APN) may provide:
1. The access point may collect all the frames from the EHWSN tags or EPTs. It may be able to manage 5000 simultaneous connections with high reliability to avoid frame redundancy and collision.
2. The collected data may be encapsulated in csv or Jason format (this can be changed) and sent to the Server to be interfaced with specific applications in order to monitor the data for a user.
3. The access point transceiver may respect the same wireless protocol of EPTs.
4. The APN may be powered with a DC voltage between 25 to 32 volts (typically it will be 28 VDC).
5. The firmware of the APN may localize the EPTs with an acceptable marge of error (5 cm-25 cm) that will be defined depending on operational environment.
6. The APN may use an integrated ARINC reader protocol to communicate the Data through an external server IP and port. The data may also be communicated by GPRS/GSM communication upon request.

7. The APN and the EPTs may include both direction communications to read and update the data on the distributed EPTs on demand through the wireless communication protocol.

8. Security and encryption at the communication APN(s) and the Server IP.

9. The Control unit of the APN is based also on a 16 bit IC with another integrated module to report using USB, the collected frames from the EPTs.

10. The Wireless access point used may be a Daughter board access point used with the wireless communication protocol (part of the APN).

RF Transmitter:

1. The EPT energy source may be powered mainly from an RF transmitter (but also including mechanical energy supplementation, where appropriate) that can provide a high range of coverage with integrated Omni directional antenna. This transmitter may be integrated inside the APN.

2. RFI (Radio frequency interference) conditions (for the APN and EPT) in board conducted between 30 KHz and 2.4 GHZ (mixed signal issues:) and in air should not interfere with the following signals:
   a. Utilization in the frequency band 117.975-137.000 MHz.
   b. Utilization in the frequency band 108-117.975 MHz
   c. Utilization in the frequency band 960-1215 MHz for DME
   d. Utilization in the frequency band 5 030.4-5150.0 MHz.

The antenna of the RF transmitter is preferably an isotropic Omni directional with 360 energy pattern distribution.

Figure 6:
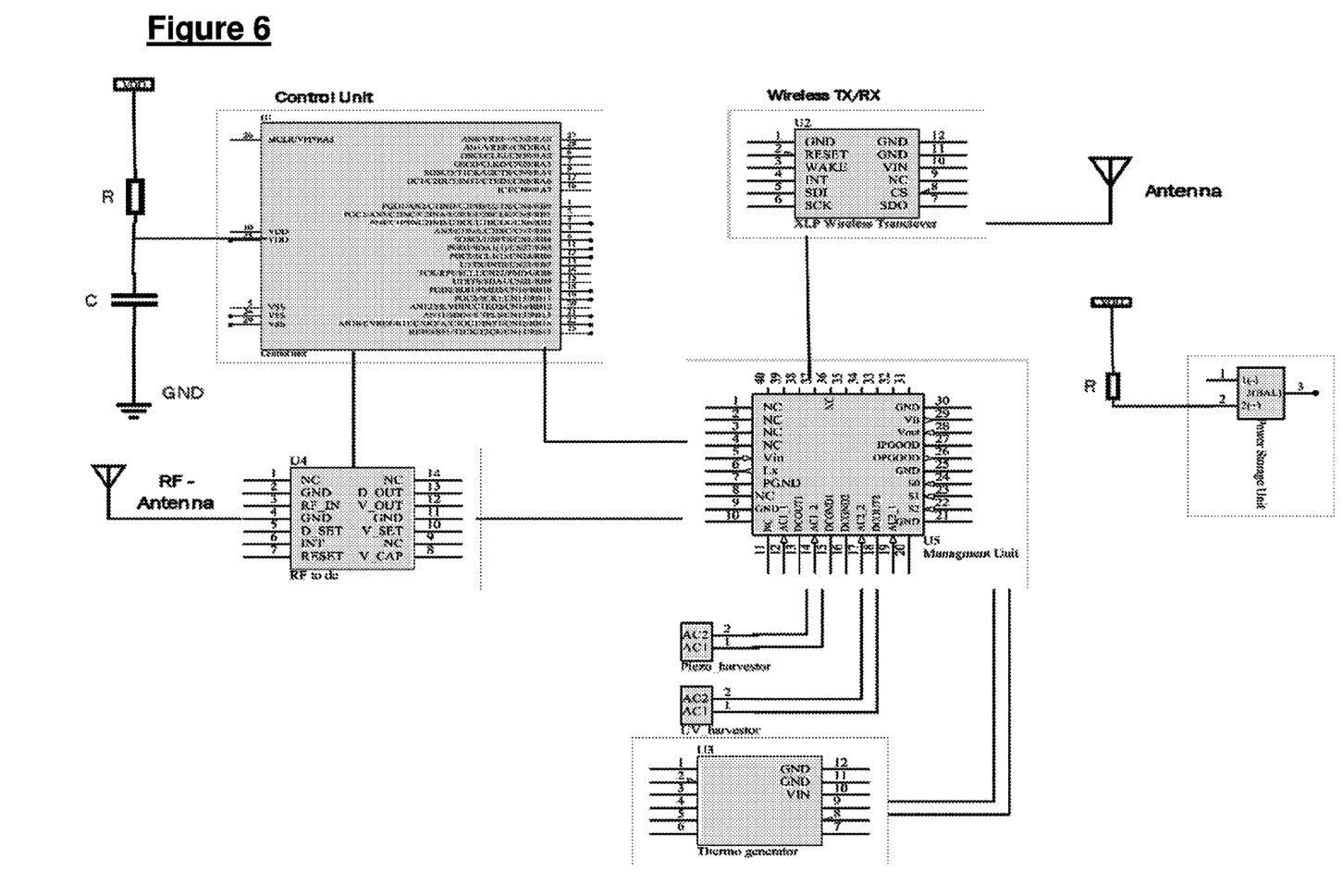
FIG. 6 shows a circuit diagram of an example tag used within the system of FIG. 1.

FIG. 6 shows a circuit diagram of an example tag including a control unit, wireless transmitter/receiver module, antenna, power storage unit, management unit, piezo harvester, uv harvester, control unit, RF antenna (power generation) and thermal (e.g. temperature gradient) generator module. Other modules may be added and any one or more of the energy generation modules (thermal, optical, mechanical, RF, etc.) may be used simultaneously or individually, depending on power demand. This demand and supply may be managed by the management unit.

Figure 7:
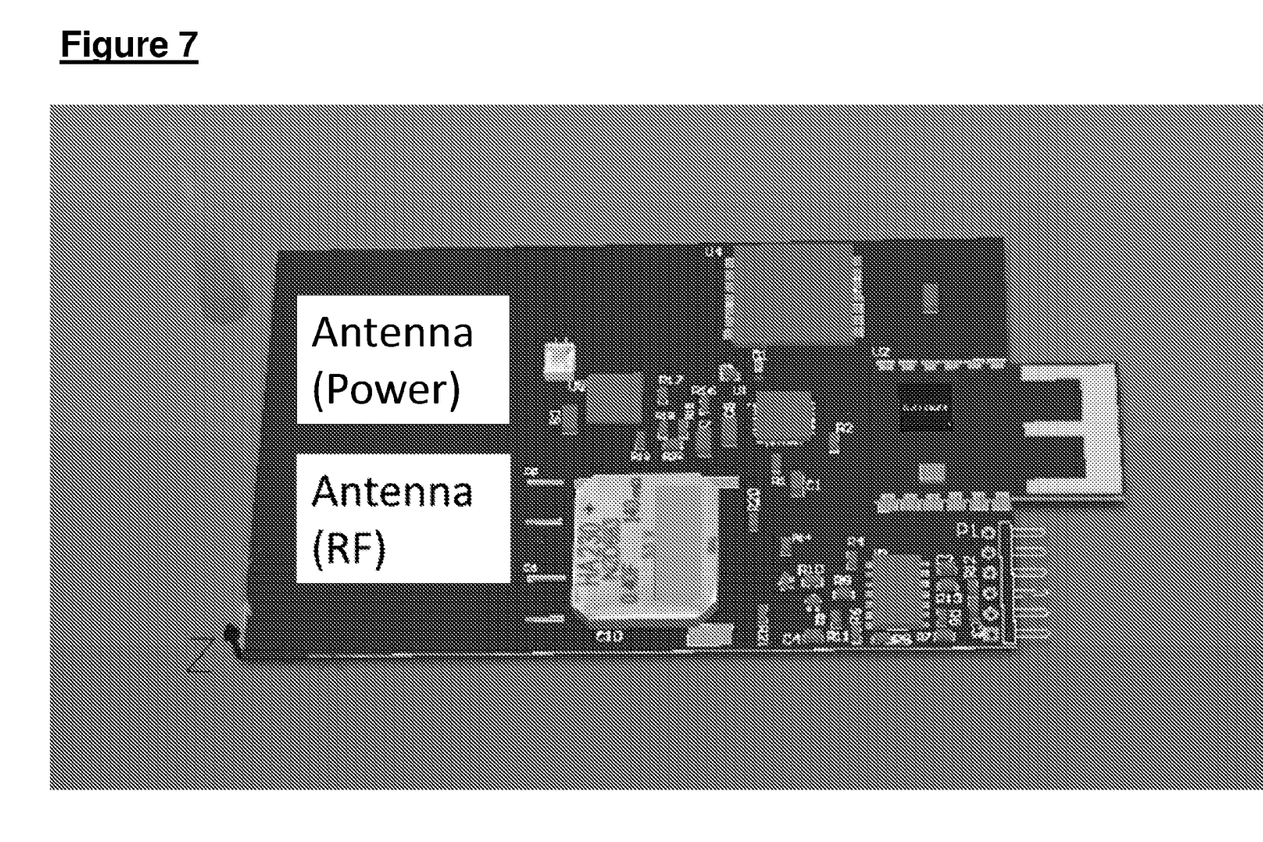
FIG. 7 shows a perspective view of an assembled tag build according to the circuit diagram of FIG. 6.

FIG. 7 shows a perspective view of an assembled tag build according to the circuit diagram of FIG. 6. Other layouts and configurations may be used. The RF antenna is used to send data to the tag reader. It may be a 3D antenna.

Figure 8:
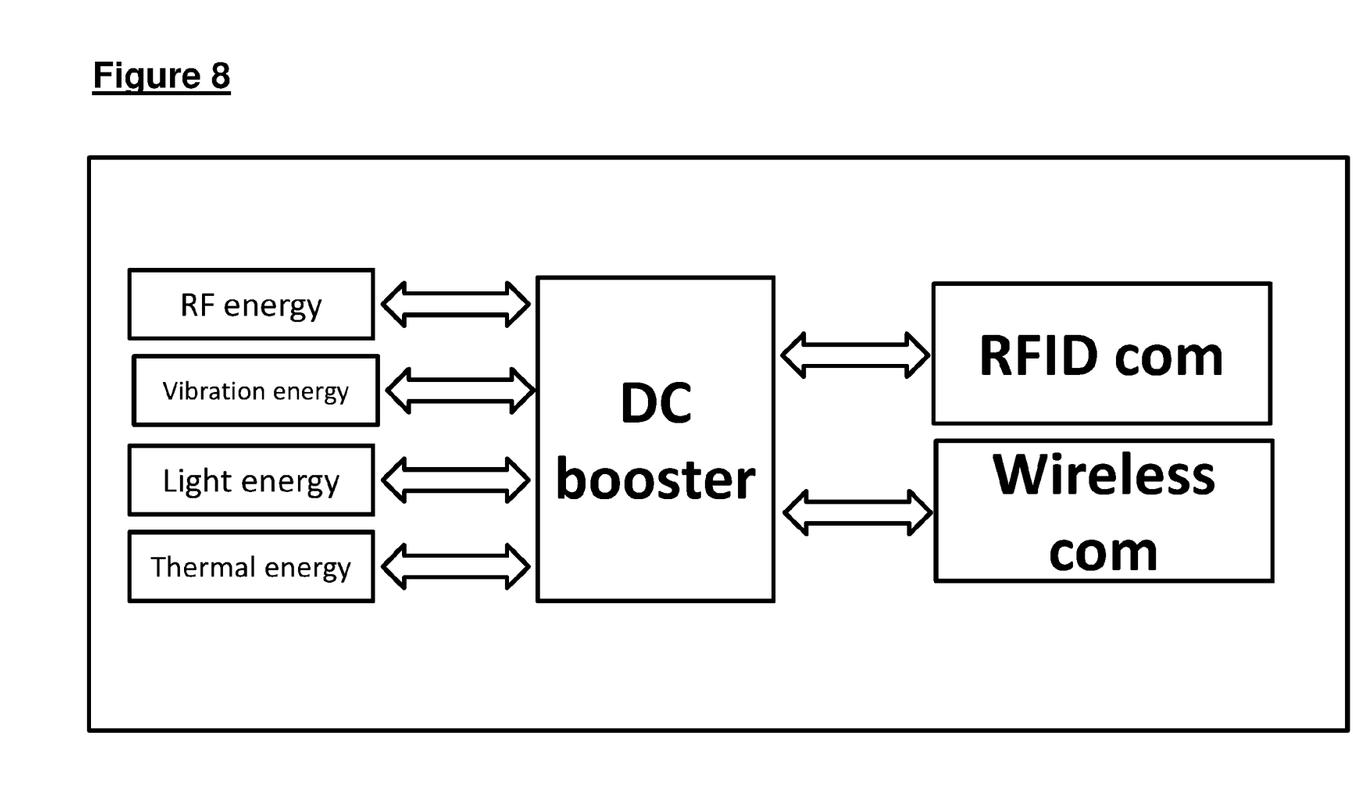
FIG. 8 shows a schematic diagram of the circuit of FIG. 6.

FIG. 8 shows a schematic diagram illustrating important elements of the circuit described with reference to FIG. 6. The thermal generator may be one supplied by Micropelt of Germany. Preferably, using a 10 degree C. interval or difference this may provide an output at 2.4 V (150 MicroW to 10 mW) to power the tag. Thermal energy harvesting (that may also be combined with RF and/or vibration generation) enabling tags (e.g. in the form of plates) to be stacked or attached to aircraft engines providing an RFID communication channel enabling communication of data back to an interrogator. This may be used where passive tags cannot.

The thermal generator or any combination of the environment energy generators, may be used to both produce electrical power and to generate data that may be stored within the tag and included in a signal that is read out by a reader. In an application where the tag is fixed to an aircraft, components of an aircraft or items within the aircraft, these data may be used to measure cycles of those components and/or the time spent on air. In some examples criteria may be applied before data is stored (e.g. trigger a recording process). These criteria may include:

i. A specific vibration level that triggers the tag (e.g. in the form of a plate attached to an engine or other component); and ii. A specific or predetermined temperature change experienced by the tag. For example, this could be a 20 degrees C. difference that is determined by a particular power generation component (e.g. a number of mW or microwatts).

Furthermore, this detected data may cause actions to occur within the tag. For example, a tag (e.g. self-powered) wakes up when a required budget of energy is available to record data. This may be triggered by any one or more of:
   i. Powered by RF harvesting;
   ii. Powered by PV available energy;
   iii. Powered by vibration; and
   iv. Powered by thermal gradient energy.

This can prevent the tag from attempting to operate when insufficient power is available.

The data can be read at intervals (e.g. when an aircraft is being inspected on the ground). These data can be used to determine that service intervals have been respected. This may be achieved by interpreting the data to find how many hours an item (e.g. an engine) had been operated and when (using an onboard timer or clock). How many cycles (e.g. take of and landings) had occurred may also be determined. These data may be compared with other data on the vehicle or aircraft as a validation step.

Different phases of operation of an engine, landing gear, power unit (e.g. auxiliary power unit of an aircraft), and thrust reverser can be detected by measuring how much power one or more of the components making up the electrical generator have generated and when. This can indicate a number of flights and their duration.

As will be appreciated by the skilled person, details of the above embodiment may be varied without departing from the scope of the present invention, as defined by the appended claims.

For example, other mechanical to electrical power generators may be used (e.g. flywheel or spring-based). Real time processing or data may be requested on demand. A super SMD capacitor may be used for fast charging and supply. Memory with extensible options may be used. Isotropic antennas may be used on the tags and/or readers. Commands may be sent from the reader to the tags through a controlled emitted signal. Reporting and monitoring within the tags may be carried out automatically on demand. Data may be read from and written to each tag from the tag reader. A specific or regulated energy amount may be harvested using vibrations and/or at the acoustic wavelength level. Additionally, solar energy may be used to power the tags). These power sources may be regulated using an AC/DC and/or DC/DC module and/or buck converter to charge a capacitor or super-capacitor or battery.

Each tag may be inside the EHWSN so they will be connected to the tag reader, which may be connected to the internet through buses or a GSM (e.g. fixed IP and port to a cloud server). Multiple antennas may be used within each tag (e.g. three) in order to provide different ranges, orientations, protocols, frequencies and/or other modes of communication. The tag energy source may switch between mechanical and RF (e.g. from the reader).

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A tracking system comprising:
a tag reader comprising an interrogating antenna;
one or more tags comprising:
an electrical energy generator configured to convert environmental energy to electrical energy, wherein the electrical energy generator is more than one generation element selected from:
a mechanical to electrical energy convertor;
a thermoelectric generator;
a solar electricity generator;
a piezo generator; and
an RF power generator
a control circuit configured to manage the electrical energy generated by the more than one generation elements;
a radio frequency, RF, communication circuit;
one or more sensors;
a controller configured to:
use the electrical energy generated by the electrical energy generator to transmit a data signal to the tag reader using the RF communication circuit and include data generated by the one or more sensors in the data signal;
an energy storage device configured to store electrical energy provided by the electrical generator and to supply the stored electrical energy for use by the controller and RF communication circuit; and
a management unit configured to prevent the tag from operating when insufficient power is available.

2. The tracking system of claim 1, wherein the tag reader further comprises a wireless network interface, the tracking system further comprising:
a receiving server configured to receive data from the wireless network interface of the tag reader, the received data including information associated with the data signal from the tag; and
a database configured to store the received data.

3. The tracking system of claim 2, wherein the receiving server is configured to send a request to the tag reader and the data is received in response to the request.

4. The tracking system of claim 1, wherein the tag further comprises an energy storage device configured to store electrical energy provided by the electrical energy generator and to supply the stored electrical energy for use by the controller and RF communication circuit.

5. The tracking system of claim 1, wherein the RF communication circuit of the tag is a transceiver and the tag reader is configured to send an interrogating signal to the tag and further wherein the tag is configured to transmit the data signal to the tag reader in response to the interrogating signal, wherein the tag is further configured to generate from the interrogating signal electrical energy to power the RF communication circuit and the controller.

6. A tag comprising:
an electrical energy generator configured to convert environmental energy to electrical energy, wherein the electrical energy generator is more than one generation element selected from:
a mechanical to electrical energy convertor;
a thermoelectric generator;
a solar electricity generator;
a piezo generator; and
an RF power generator;
a control circuit configured to manage the electrical energy generated by the more than one generation elements;
a radio frequency, RF, communication circuit;
one or more sensors;
a controller configured to use the electrical energy generated by the electrical energy generator to transmit a data signal to the tag reader using the RF communication circuit and include data generated by the one or more sensors in the data signal;
an energy storage device configured to store electrical energy provided by the electrical generator and to supply the stored electrical energy for use by the controller and RF communication circuit; and
a management unit configured to prevent the tag from operating when insufficient power is available.

7. The tag of claim 6, wherein the energy storage device is a capacitor or a secondary battery.

8. The tag according to claim 1, wherein the controller is further configured to include data generated by the one or more sensors in the data signal, the tag further comprising:
a memory store configured to store the data generated by the one or more sensors.

9. The tag of claim 8, wherein the one or more sensors measure any one or more of: humidity, vibration, movement, motion, gyroscope, acceleration, GPS, temperature, light or sound.

10. The tag according to claim 6, wherein the communication circuit is a transceiver and the controller is further configured to receive an interrogating signal from the RF tag reader and to transmit the data signal to the tag reader in response to the interrogating signal.

11. The tag according to claim 6 further comprising an RF to DC conversion circuit.

12. The tag according to claim 6 further configured to record data acquired from the electrical generator; and
a memory store configured to store the data acquired from the electrical generator.

13. A method for operating a tag having an electrical energy generator configured to convert environmental energy to electrical energy, wherein the electrical energy generator is more than one generation element selected from:
a mechanical to electrical energy convertor;
a thermoelectric generator;
a solar electricity generator;
a piezo generator; and
an RF power generator;
a control circuit configured to manage the electrical energy generated by the more than one generation elements;
and a radio frequency, RF, communication circuit;
one or more sensors;
a controller configured to use the electrical energy generated by the electrical energy generator to transmit a data signal to the tag reader using the RF communication circuit and include data generated by the one or more sensors in the data signal;
an energy storage device configured to store electrical energy provided by the electrical generator and to supply the stored electrical energy for use by the controller and RF communication circuit; and
a management unit configured to prevent the tag from operating when insufficient power is available, the method comprising the step of:
using electrical energy generated by the electrical energy generator to transmit a data signal to a tag reader using the RF communication circuit.

14. The method of claim 13, wherein the data signal includes an identifier of the tag.

15. The method of claim 13 further comprising the steps of:
- acquiring data from the electrical energy generator of the tag; and
- storing the data before transmitting the data signal, including the acquired data, to the tag reader.

16. The method of claim 15, wherein the acquired data indicates any one or more of:
- a time period that electrical energy was being generated by the electrical energy generator;
- a power level generated by the electrical energy generator;
- a number of times the electrical energy generator was generating power; and
- a number of times the electrical energy generator reached one or more threshold power levels.

17. The method of claim 15 further comprising the step of:
- determining any one or more of: a cycle number, operation number, operation time; a service interval, number of aircraft flights, and abnormal operation characteristic, of a component attached to the tag based on the acquired data,
- wherein the determining step further includes analysing a plurality of data items within the acquired data to determine a repeated series of events defined by the plurality of data items, and
- wherein the tag is attached to any of: an aircraft, an engine, a power unit, an auxiliary power unit, thrust reverser; and landing gear.

* * * * *

UNITED STATES PATENT AND TRADEMARK OFFICE
CERTIFICATE OF CORRECTION

PATENT NO. : 10,528,856 B2  
APPLICATION NO. : 16/096553  
DATED : January 7, 2020  
INVENTOR(S) : Kuzbari et al.

Page 1 of 1

It is certified that error appears in the above-identified patent and that said Letters Patent is hereby corrected as shown below:

On the Title Page

Item (73)
Please delete "Novus Communications LTD" and insert --NVS Technology Solutions LTD--.

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*